(12) United States Patent
Brendel

(10) Patent No.: US 7,593,098 B2
(45) Date of Patent: Sep. 22, 2009

(54) HIGH DYNAMIC RANGE PHOTON-COUNTING OTDR

(75) Inventor: Jürgen Brendel, Nyon (CH)

(73) Assignee: Luciol Instruments SA, Mies (CH)

( * ) Notice: Subject to any disclaimer, the term of this patent is extended or adjusted under 35 U.S.C. 154(b) by 0 days.

(21) Appl. No.: 11/959,475

(22) Filed: Dec. 19, 2007

(65) Prior Publication Data
US 2008/0231842 A1    Sep. 25, 2008

Related U.S. Application Data

(60) Provisional application No. 60/891,541, filed on Feb. 26, 2007.

(51) Int. Cl.
*G01N 21/00* (2006.01)
(52) U.S. Cl. .................................... 356/73.1
(58) Field of Classification Search ............... None
See application file for complete search history.

(56) References Cited

U.S. PATENT DOCUMENTS

| | | | | |
|---|---|---|---|---|
| 4,289,398 | A * | 9/1981 | Robichaud | 356/73.1 |
| 4,713,538 | A * | 12/1987 | Theocharous | 250/227.23 |
| 5,066,118 | A * | 11/1991 | Buerli | 356/73.1 |
| 5,069,544 | A * | 12/1991 | Buerli | 356/73.1 |
| 5,343,286 | A * | 8/1994 | Keeble et al. | 356/73.1 |
| 5,491,548 | A * | 2/1996 | Bell et al. | 356/73.1 |
| 5,767,956 | A * | 6/1998 | Yoshida | 356/73.1 |
| 7,355,163 | B2 * | 4/2008 | Watley et al. | 250/227.14 |
| 2005/0259242 | A1 * | 11/2005 | Bridge et al. | 356/73.1 |

FOREIGN PATENT DOCUMENTS

JP    2004219203 A  *  8/2004

OTHER PUBLICATIONS

Huttner et al., "Photon-counting thechniques for fiber measurements", published in Lightwave, 2000, p. 1-4.
Huttner et al., "Optical time-domain reflectometer for POF".
Beller, "OTDRs and Backscatter Measurements", in "Fiber Optic Test and Measurement", D. Derickson Ed. (Prentice Hall, Upper Saddle River, New Jersey, 1988, p. 434-474.

* cited by examiner

*Primary Examiner*—Michael A Lyons
*Assistant Examiner*—Gordon J Stock, Jr.
(74) *Attorney, Agent, or Firm*—MOETTELI & Associés SàRL

(57) ABSTRACT

An optical time domain reflectometer (OTDR) operates in a gated mode, enabling a predetermined width of an optical fiber to be analyzed. The OTDR may test only a desired position on the fiber. Data obtained along different lengths of the fiber may be combined together, providing a thorough representation of the fiber characteristics. Alternatively, specific regions of the fiber may be analyzed. The OTDR measures the backscattered signal using photon-counting techniques, and improves the accuracy of such algorithms by attenuating the incoming backscattering signals automatically and independently at each position in the fiber being tested. The OTDR simultaneously achieves a high dynamic range and a high temporal/spatial resolution, an improvement over conventional OTDRs.

13 Claims, 7 Drawing Sheets

HIGH DYNAMIC RANGE PHOTON-COUNTING OTDR

CROSS REFERENCE TO RELATED APPLICATIONS

This application claims priority to U.S. provisional application No. 60/891,541, of the same title, filed Feb. 26, 2007, the content of which is incorporated herein by reference thereto.

FIELD OF THE INVENTION

This invention relates to the field of testing optical fibers and, more particularly, to using optical time domain reflectometry to characterize an optical fiber.

BACKGROUND OF THE INVENTION

Optical time domain reflectometry (OTDR) is widely used in the field of telecommunications. In OTDR, a short pulse of light (typically, laser light of duration between 10 ns to 10 μs) is launched into an optical fiber (the fiber under test, or FUT). Reflected light returning from the fiber is collected by a photodetector (e.g., a photodiode), and displayed. The OTDR further notes the difference between the launch time and the detection time. Using OTDR, a spatially resolved analysis of the backscattered signal over the entire length of the FUT is obtained. By reviewing the recorded amplitude versus time trace, a technician may identify breaks, damage, strong reflections, bad connections, strong bends, crushing, and other characteristics of the FUT.

For simplicity, the backscattered signals that are captured and measured by the OTDR are referred to as an "RBS signal" even though the signal is actually made up of multiple distinct signals. The RBS signal measured by the OTDR occurs due to microscopic fluctuations or defects in the fiber, which cause the light launched into the FUT to scatter in all directions. Part of this scattered light, the RBS signal, is coupled back in the backward direction of the fiber, and may thus be measured by the OTDR. The intensity of the RBS signal is proportional to the duration of the incoming light signal, which is typically a short width laser pulse. Since the backscattered signal strength depends on the losses in the FUT, the attenuation of an optical signal propagating through the fiber may be measured as a function of the distance.

With very short laser pulses being launched into the FUT, the OTDR is able to achieve a high temporal/spatial precision. Since the RBS signal is proportional to the width of the laser pulse, the shorter the laser pulse width, the less optical power to be received at the photodetector of the OTDR.

On the other hand, to increase the resolution of the OTDR, the photodetector (and associated amplifiers) needs to have a larger bandwidth. Such high-bandwidth devices have a lower sensitivity. For this reason, conventional OTDRs are unable to simultaneously achieve high spatial/temporal resolution and high sensitivity.

A photodetector that performs photon counting may overcome these constraints. Photon counting allows detecting very low light levels, down to the single photon level. Photon counting techniques may achieve a temporal resolution of better than 1 nanosecond (ns). However, photodetectors that perform photon counting have a limited dynamic range. The dynamic range of an OTDR is the difference between the highest and the lowest measurable RBS signal. Since a photon-counting OTDR cannot detect more than one photon for each emitted laser pulse, high backscatter levels lead to a saturation of the photodetector.

Thus, there is a continuing need for an OTDR that simultaneously achieves a high temporal/spatial resolution and a high dynamic range.

SUMMARY OF THE INVENTION

A novel optical time domain reflectometer (OTDR) is disclosed. The OTDR is capable of selecting a discrete portion of an optical fiber to analyze at a high resolution. The OTDR includes a position circuit and a gate width circuit, for specifying the position and width of the fiber to be analyzed. Discrete outputs obtained by the OTDR may be combined, providing a more complete representation of the optical fiber or fiber portion. The OTDR, which analyzes the incoming backscattering signal using photon-counting techniques, also includes a variable optical attenuator, to prevent saturation of the photodetector prior to analysis. The variable optical attenuator changes the attenuation, based on the strength of the incoming signal, each time the position in the fiber changes. The enhanced circuitry enables the OTDR to analyze the optical fiber in a variety of ways, with increased resolution and a high dynamic range.

DETAILED DESCRIPTION OF THE PREFERRED EMBODIMENTS

According to the embodiments described herein, a novel OTDR is disclosed. The OTDR is capable of operating in a gated mode, such that a predetermined width of the fiber under test is analyzed. The OTDR further is capable of selecting where on the fiber the analysis is done. Separately obtained data along different lengths of the fiber may be combined, for analysis of the entire fiber, or data on specific regions of the fiber may readily be obtained. Finally, the OTDR is able to attenuate incoming backscattering signals, automatically and independently for each fiber position, such that an accurate analysis of the signal may be made using photon counting. The OTDR thus simultaneously achieves a high dynamic range and a high temporal/spatial resolution, in contrast to conventional OTDRs.

Figure 1:
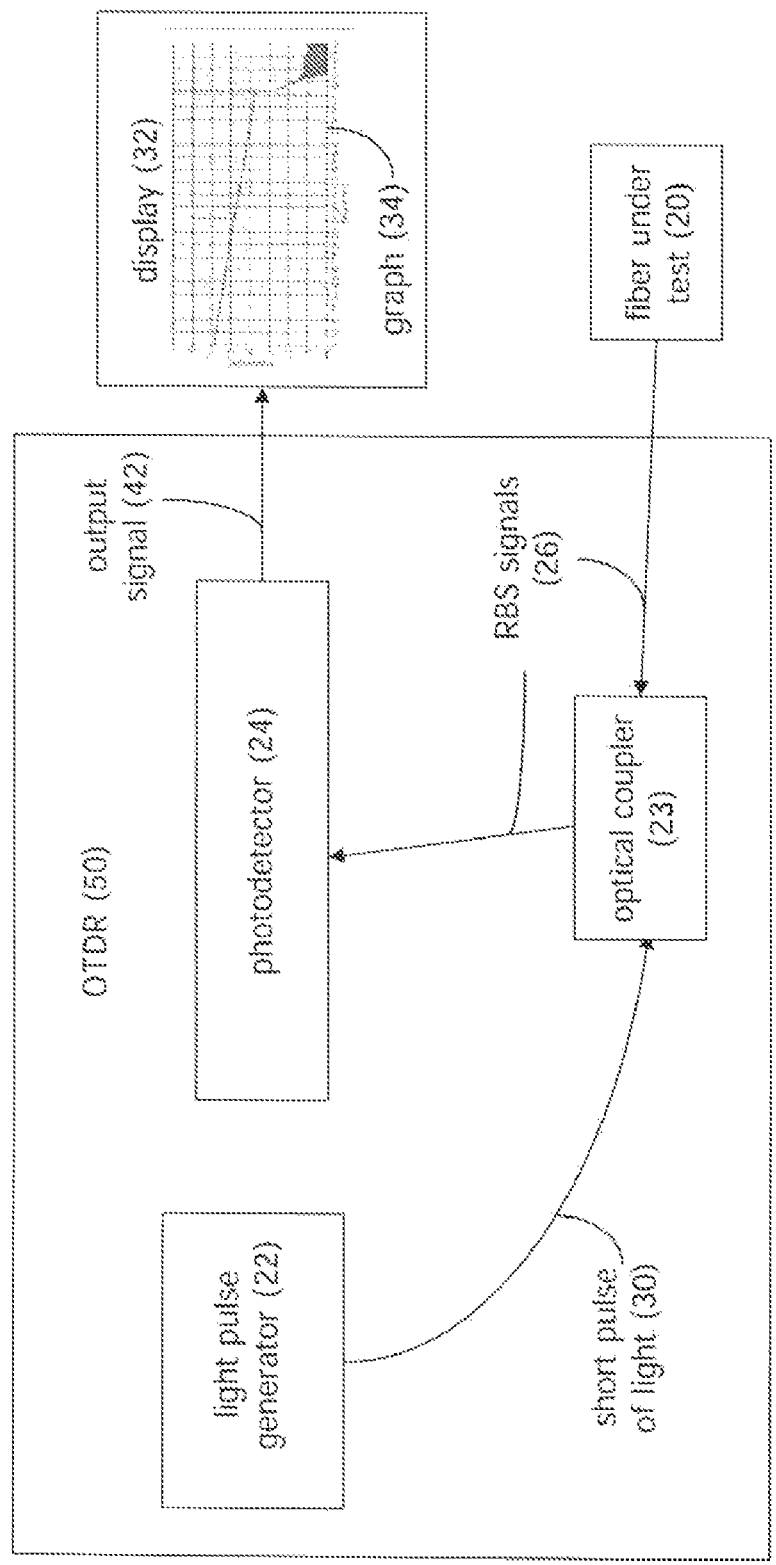
FIG. 1 is a simplified block diagram of an optical time domain reflectometer, according to the prior art.

FIG. 1 is a simplified block diagram of an OTDR 50, according to the prior art. The OTDR 50 is coupled to one end of an optical fiber, or fiber under test (FUT) 20, and includes a light pulse generator 22, and optical coupler 23, and a photodetector 24. The light pulse generator 22 sends or feeds a short pulse of light 30 via the coupler 23 into the FUT 20.

The pulse of light 30 is typically laser-generated, but may in the alternative be a light-emitting diode or other source of light.

Backscattered light 26, emerging from the FUT 20, is captured by the photodetector 24. The backscattered signals 26 are also substantially weaker signals than the signal 30 that entered the fiber 20. The OTDR generates an output signal 42, which may be sent to a display 32 in graphical form 34. The output signal 42, visually depicted in the graph 34, characterizes the FUT 20, such that breaks, poor connections, and other occurrences, may be identified.

OTDRs may include powerful detectors to capture the RBS signals from the optical fiber. For very low power signals coming from the fiber, the OTDR may employ photon-counting techniques. For non-photon-counting OTDRs, the detectors are always active. Typically, the photodetector of the OTDR produces a signal representing the detected RBS, which is then digitized into time bins relative to the launch time of the light pulse generator.

Photon-counting OTDRs, by contrast, may be operated in a gated mode. In such a mode, the OTDR is not continuously active, but may be activated at a given time and for a given duration. The gated mode thus allows the OTDR to obtain the RBS signal localized to a given position in the FUT, and may control the width of the position being measured, producing an output signal representing a discrete portion of the FUT. In other words, the OTDR may operate like a shutter, selectively being turned on and off only at a predetermined point in the fiber. The resolution of the OTDR operating in this gated mode corresponds to the width of the gate.

Figure 2:
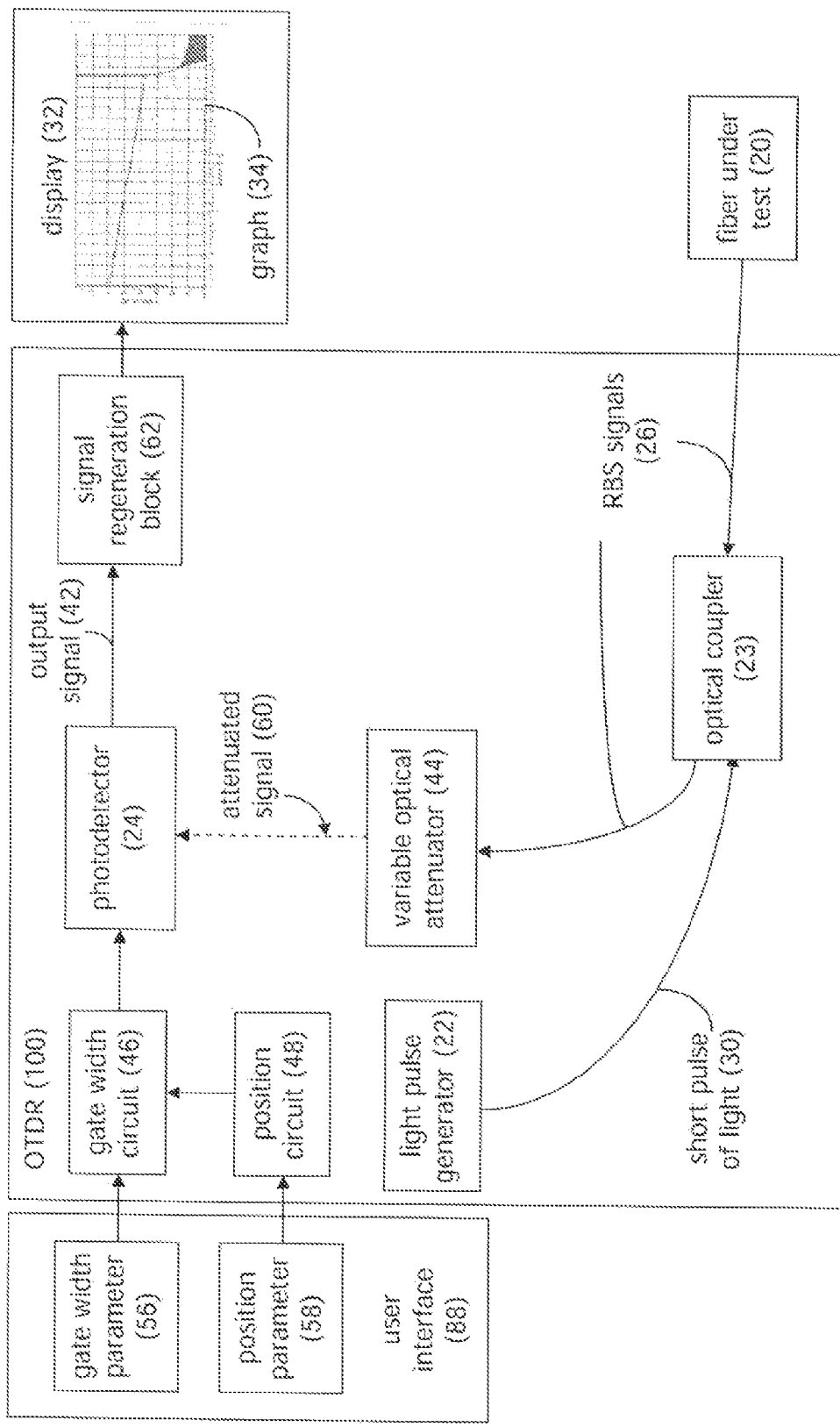
FIG. 2 is a simplified block diagram of an optical time domain reflectometer, according to some embodiments.

FIG. 2 is a simplified block diagram of an OTDR 100, according to some embodiments. In addition to having a light pulse generator 22, a coupler 23, and a photodetector 24, the OTDR 100 includes a gate width circuit 46, a position circuit 48, and a variable optical attenuator 44. Each of these components is described in more detail, below.

The OTDR 100, operating in a gated mode, is capable of selecting a portion of the FUT 20 and performing analysis on that portion, irrespective of length or other characteristics of the fiber. The OTDR 100 enables two aspects of the analysis to be controlled: the resolution and the position on the FUT 20. The gate width circuit 46 and the position circuit 48, respectively, control these aspects of the OTDR 100.

The gate width circuit 46 controls the duration of the temporal window during which the photodetector 24 is activated, and thus the temporal/spatial resolution of the OTDR. In some embodiments, the gate width circuit 46 is an electronic gating circuit with a variable pulse width. The OTDR 100 is capable of controlling the resolution of measurements taken of the FUT 20, by adjusting a parameter of the gate width circuit 46, known herein as a gate width parameter 56. The gate width parameter 56 identifies a desired predetermined time duration (and, thus, fiber width) to be analyzed. To achieve a high resolution, a small gate width parameter 56 may be selected; to achieve a lower resolution, a relatively larger gate width parameter 56 may be selected.

Since the FUT 20 is unlikely to be uniform in its characteristics, the gate width may be changed according to empirically obtained characteristics of the fiber. Thus, the OTDR 100 may be run a first time, with a selected gate width, w, at a first location of the FUT 20. Based on the result of that test, the gate width may be changed. So, if an event at the first location is identified, the OTDR 100 may be run again, this time with a second selected gate width parameter 56, say ½ w, at the first location of the FUT 20. The OTDR run with the ½ w gate width parameter 56 will have a higher resolution, and may thus provide additional information not obtained in the first OTDR run.

The second aspect of the analysis is the position in the FUT 20 being analyzed, and is controlled by the position circuit 48. In some embodiments, the position circuit 48 is a variable electronic delay line. The position circuit 48 uses a time delay to calculate the position in the fiber where the test results are obtained. Since the short pulse of light 30 is transmitted at a constant speed, $c_f$ (the speed of light propagating in the fiber), the distance along the FUT 20 may be obtained by multiplying half the time elapsed from the emission of the pulse of light 30, $t_n$, by $c_f$.

As with the gate width circuit 46, the position circuit 48 may accept a different parameter, known herein as a position parameter 58, to change the desired position in the FUT 20 to be analyzed. The position parameter 58 identifies a desired predetermined location on the fiber to be analyzed. The position parameter 58 is actually a time value, $t_n$, which nevertheless specifies the desired position on the FUT 20. A position parameter 58, $t_n$, which is small, causes the OTDR 100 to analyze a portion of the FUT 20 (of length specified by the gate width parameter 56) that is close to the OTDR. A position parameter 58, $t_n+k$ that is relatively larger, causes the OTDR 100 to analyze a portion of the FUT 20 that is relatively farther away from the OTDR.

The gate width parameter 56 and the position parameter 58 are shown as part of a user interface 88 coupled to the OTDR 100. The user interface 88, a means to receive the gate width parameter 56 and the position parameter 58 from a user of the OTDR 100, may be a keyboard or mouse, part of a processor-based system such as a personal computer, a server, a set-top box, and the like. Likewise, the display 32 (shown on the other side of FIG. 2) may be part of the user interface 88. Alternatively, the gate width and position parameters 56, 58 may be entered using switches, knobs, touch screens, and so on. Or, the parameters may be supplied automatically to the OTDR using a software program. System designers of ordinary skill in the art recognize a variety of possible implementations for obtaining the desired parameters from a user of the OTDR 100. Finally, the OTDR may recognize default parameters for each of the gate width and position parameters, where no parameters are specified.

In FIG. 2, the display 32 is shown as being connected to, but not part of the OTDR 100. Alternatively, the display 32 may be part of the user interface 88 or may be contained within the housing of the OTDR 100. As another option, the OTDR 100 may include a small display and a display connector, providing the ability to connect to a larger display, such as a computer monitor or television screen. The small screen may be useful for portable use of the OTDR 100, such as during field testing, where the connection to a larger display may be preferred in a controlled testing environment, such as a factory setting.

Both the gate width circuit 46 and the position circuit 48 are coupled to the photodetector 24. The short pulse of light 30 generated by the light pulse generator 22 travels through the entire length of the optical cable 20. By sending data from the gate width circuit 46 and position circuit 48 into the photodetector 24, the photodetector knows which portion of the fiber (and for what duration) to analyze.

The process may be repeated, with the OTDR 100 performing analysis on a different portion of the FUT 20 each time. As with the gate width, the desired position in the FUT 20 to be analyzed may be empirically determined. As one example, the OTDR 100 may be run with a predetermined position parameter, $t_n$, and a gate width parameter, w, then with a position parameter, $t_{n+1}$, then $t_{n+2}$, and so on. After analyzing the obtained data, one of the positions may be revisited with a narrower gate parameter, say ¼ w. Or, a position parameter, $t_n$, may be selected with a relatively wide gate parameter, 5 w (for a low-resolution output), followed by analysis of the results, and then a re-execution of the OTDR 100, with more refined parameters 56 and 58.

Using the aforementioned techniques, the output signal 42 of the photodetector 24 corresponds to the RBS signal 26 at a certain, controlled position in the optical fiber 20. The OTDR 100 may thus resemble an optical power meter with time resolved detection measuring the backscattered optical power at any point on the optical fiber. In order to acquire a typical OTDR trace, this measurement may be repeated while changing the measurement position (the position parameter 58) with the position circuit 48.

Figure 6:
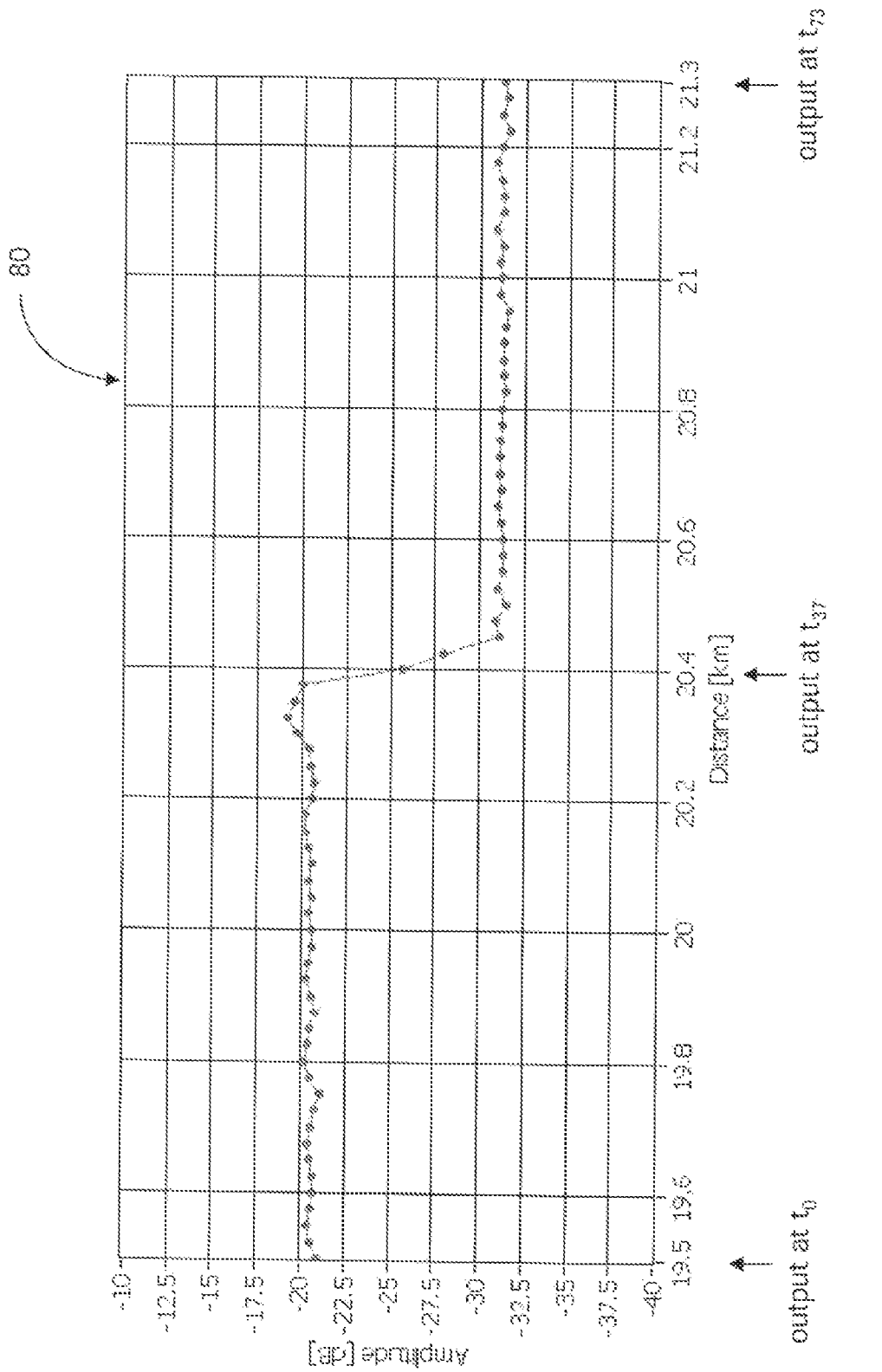
FIG. 6 is a diagram of an output graph generated by the OTDR of FIG. 2, in which distinct portions of the graph are separately generated by the OTDR, according to some embodiments.

The OTDR 100 includes a signal regeneration block 62, in some embodiments. The signal regeneration block 62 takes multiple, discrete output signals 42, taken from different positions on the FUT 20, and joins them together to form a single, complete representation of the optical fiber, or a portion thereof. The signal regeneration block 62 may consist of hardware, software, or a combination of hardware and software. The resulting graph created by the signal regeneration block 62 is depicted in FIG. 6, below.

Figure 3:
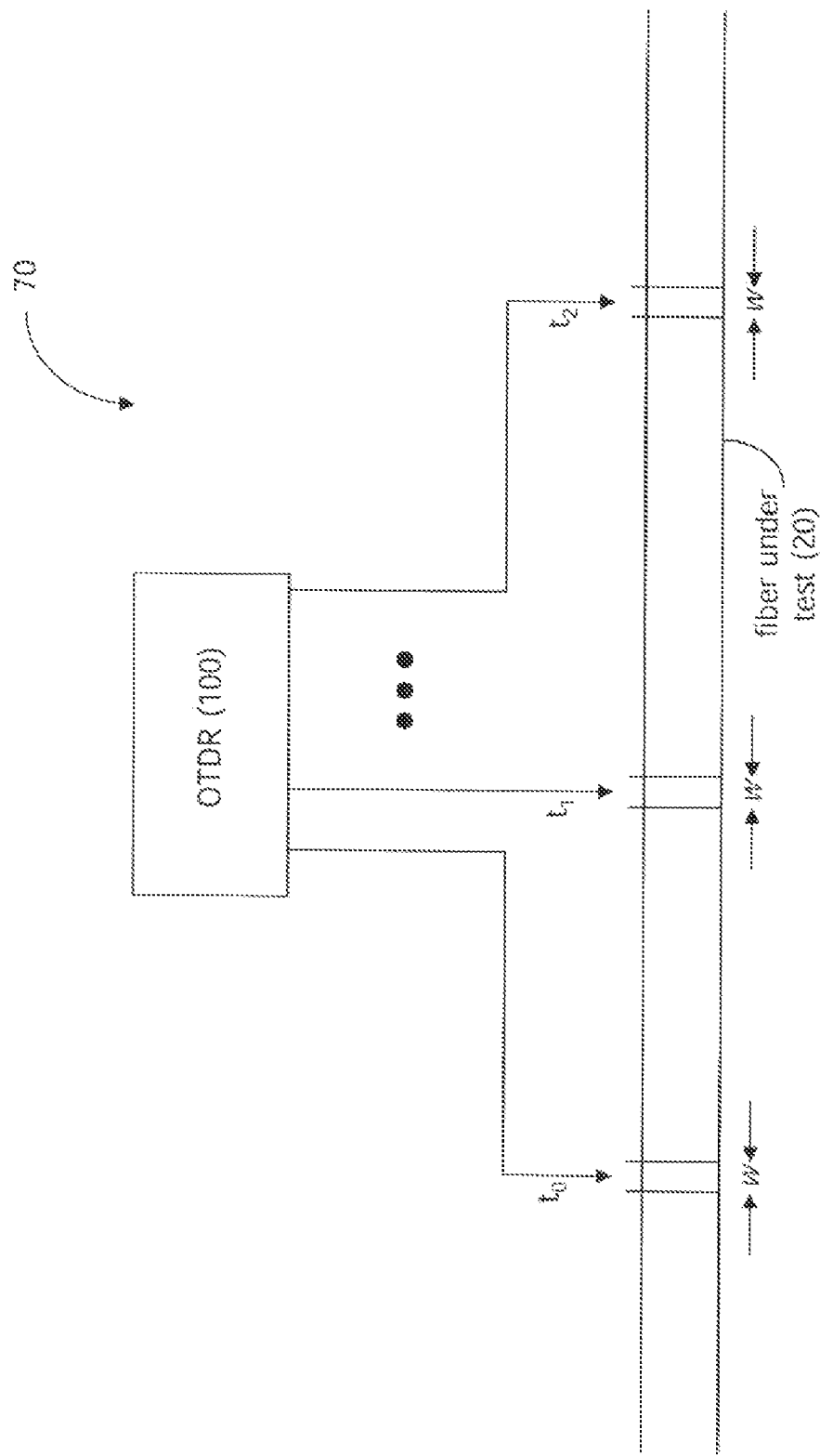
FIGS. 3-5 are simplified block diagrams illustrating the selection of both a gate width and a position along the fiber under test by the OTDR of FIG. 2, according to some embodiments.
Figure 4:
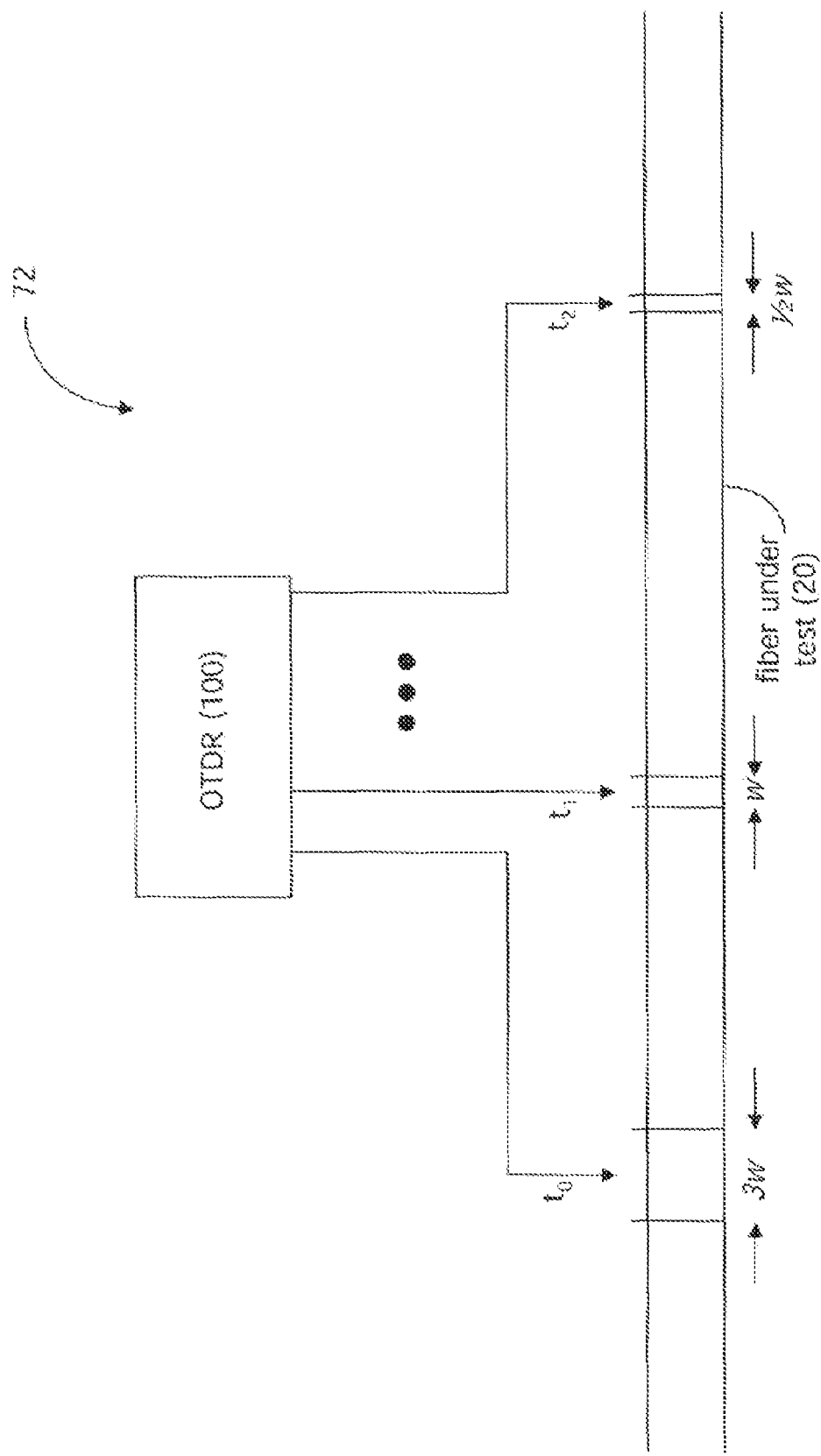
Figure 5:
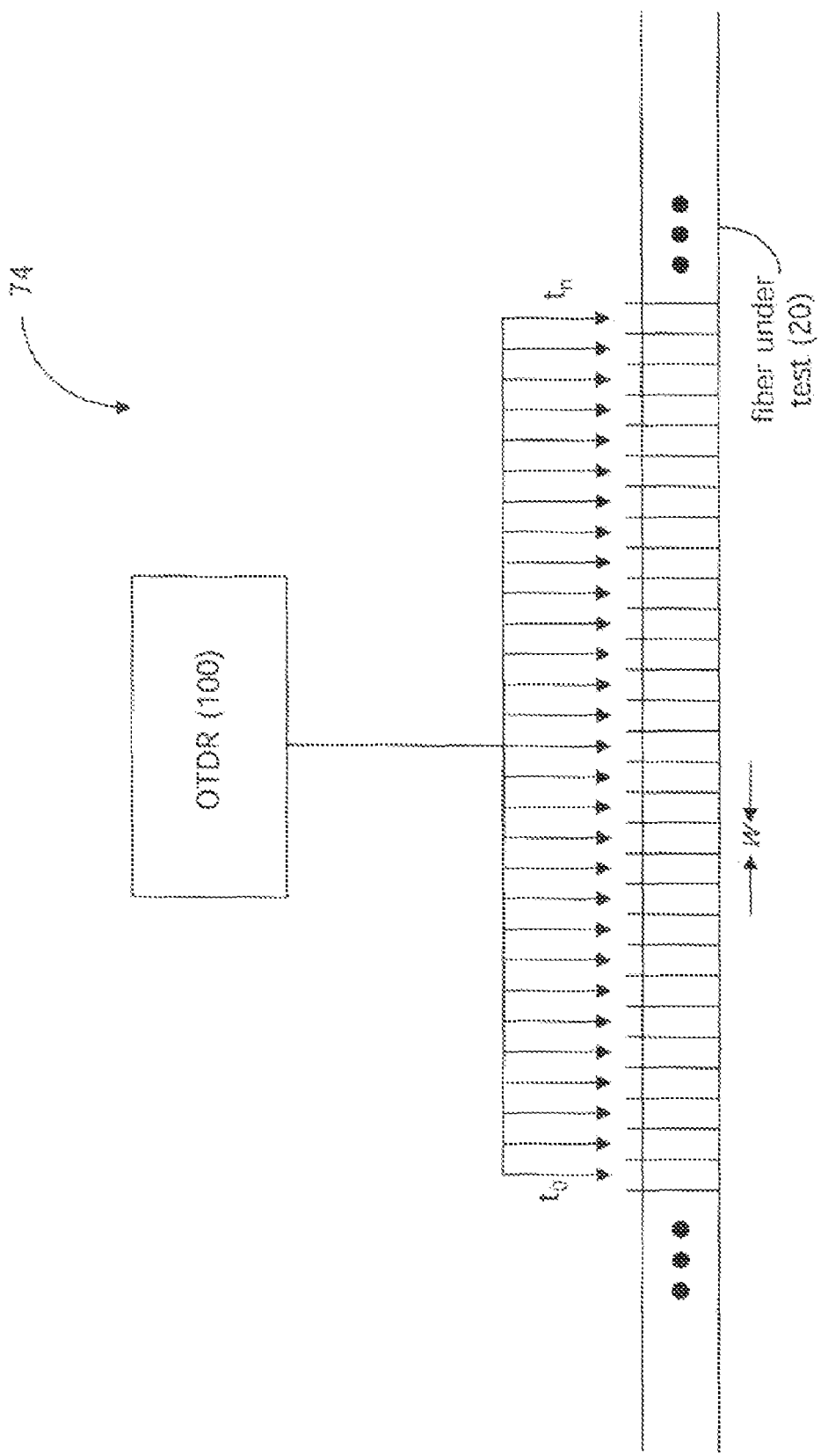

By enabling an operator to change the gate width and position parameters 56, 58, the OTDR 100 is capable of virtually limitless analyses. Illustrations of three possible implementations (analysis 70, analysis 72, and analysis 74) of the OTDR 100 operates are depicted in FIGS. 3, 4, and 5, respectively, according to some embodiments. In FIG. 3, analysis 70, the FUT 20 is tested by the OTDR 100 at three distinct locations. The gate width is the same at each location. Position parameter $58=t_0$, $t_1$, and $t_2$, gate width parameter $56=w$.

In FIG. 4, analysis 72, the position parameters 58 have not changed (still, $t_0$, $t_1$, and $t_2$), but the gate width parameters 56 are now changed, with the gate width parameter of 3 w, w, and ½ w, respectively. In FIG. 5, analysis 74, the positions selected by the OTDR 100 are adjacent to one another, with a finite width, w, at each position. Position parameter $58=t_0$, $t_1$, $t_2$, ..., $t_n$, gate width parameter $56=w$. Thus, every portion of the FUT 20 (within the range $t_0$-$t_n$, at least) is analyzed by the OTDR 100. The analysis 74 of FIG. 5 may be a preferred initial test, from which some empirical information about the FUT 20 may be obtained, prior to conducting more specific analysis.

Particularly when performing measurements of uninterrupted, adjacent portions of the optical fiber 20, such as in FIG. 5, the cumulative data from the distinct measurements obtained may be used to build a trace representing the backscattered signal 26 of the entire FUT 20. An example graph 80 is depicted in FIG. 6, according to some embodiments. The graph 80, created by the signal regeneration block 62, consists of discrete "slices" of analysis information obtained by the OTDR 100 during testing of the FUT 20. Each "slice" has the same width, w, the gate width parameter 56. The position parameter 58 is changed for each test, $t_0$-$t_{73}$. Note that output at $t_{37}$ is also indicated. Since each position tested is adjacent to a previous position tested, the results of the testing may be combined, resulting in an output signal 42 that characterized the FUT 20 between positions $t_0$ and $t_{73}$.

As indicated above, the OTDR 100 measures the RBS signal 26 using a photon-counting technique. With photon-counting, the dynamic range of the OTDR is limited. The OTDR 100 overcomes this limitation using the variable optical attenuator 44, according to some embodiments. As shown in FIG. 2, the attenuator 44 is added in front of the photodetector 24 (however, it could also be added in front of the coupler 23). The variable optical attenuator 44 is used to adjust the incoming optical power level of the RBS signal 26 to a level below the saturation level of the photodetector. In other words, if the RBS signal 26 exceeds a predetermined strength, and that predetermined strength would be enough to saturate the photodetector 24, the variable optical attenuator will attenuate the signal to a lower level. This ensures that no saturation of the photodetector 24 occurs, enabling the photodetector to obtain a more accurate reading.

The variable optical attenuator 44 works as follows. Suppose the photodetector 24 may accept 1-100 photons, but the RBS signal 26 has 1000 photons. If the photodetector 24 detects 100 photons, 110 photons, 200 photons, 300 photons, or more photons, the same output signal 42 is produced. This is known as saturation of the photodetector.

To avoid this saturation, the variable optical attenuator 44 first attenuates the RBS signal 26 to a smaller number of photons, say ten photons (divide by 100), producing an attenuated signal 60, as shown in FIG. 2. The attenuated signal 60 is shown as dotted lines, indicating that the signal is weaker than the original RBS signal 26. The photodetector 24 is able to obtain an accurate measurement of the attenuated signal 60 (where it could not with the original RBS signal 26). Following the measurement, a calculation is made (multiply by 100) to get the result back to the pre-attenuated level. The multiplied result accurately represents the original RBS signal 26.

This adjustment to the attenuation may be separately performed for each measurement position selected by the position circuit 48. Put another way, it is possible to independently select the attenuation with each time slice. As used herein, the variable optical attenuator 44 operating independently for each measurement position means that an attenuation setting at one position may be different than an attenuation setting at a second position, and different than an attenuation setting at a third position, and so on, even where the positions being tested are adjacent to one another. Thus, where an abundance of signal strength is found for a given position and width, the variable optical attenuator 44 will attenuate the signal, enabling the photodetector 24 to accurately measure the signal. The strong signal may be due to a break in the FUT 20, for example. A position very close to the previously tested position, therefore, may have no damage and may thus be quite weak requiring no attenuation. The VOA 44 may be independently adjusted for each portion of the fiber being tested.

Further, the attenuation may be automatic. As soon as the variable optical attenuator 44 determines that the RBS signal 26 is saturated, the attenuator automatically adjusts the signal strength downward such that an accurate reading may be obtained by the photodetector 24.

The dynamic range of the photodetector 24 plus the attenuator 44 equals the sum of the dynamic ranges of the two components. The measured optical power at a given point of the trace may be calculated using the receiver signal 24 and the attenuation level of the variable optical attenuator 44. To obtain a precise result, the attenuator 44 may be calibrated or the attenuation level may be measured when the setting of the level has been completed.

In some embodiments, using the variable optical attenuator 44 with a wide attenuation range increases the dynamic range of the OTDR 100 significantly over conventional OTDRs. While many photon-counting OTDRs have a dynamic range that is limited to about 15 dB, the present invention allows increasing the dynamic range to over 40 dB.

In addition to the above properties, the OTDR 100 may be set to perform a predetermined number of detections (e.g., 1000 pulses) at a single position/location of the FUT. From these multiple calculations, a probability distribution of how many photons are detected may be ascertained. In this manner, the resolution of the OTDR 100 is further improved.

Figure 7:
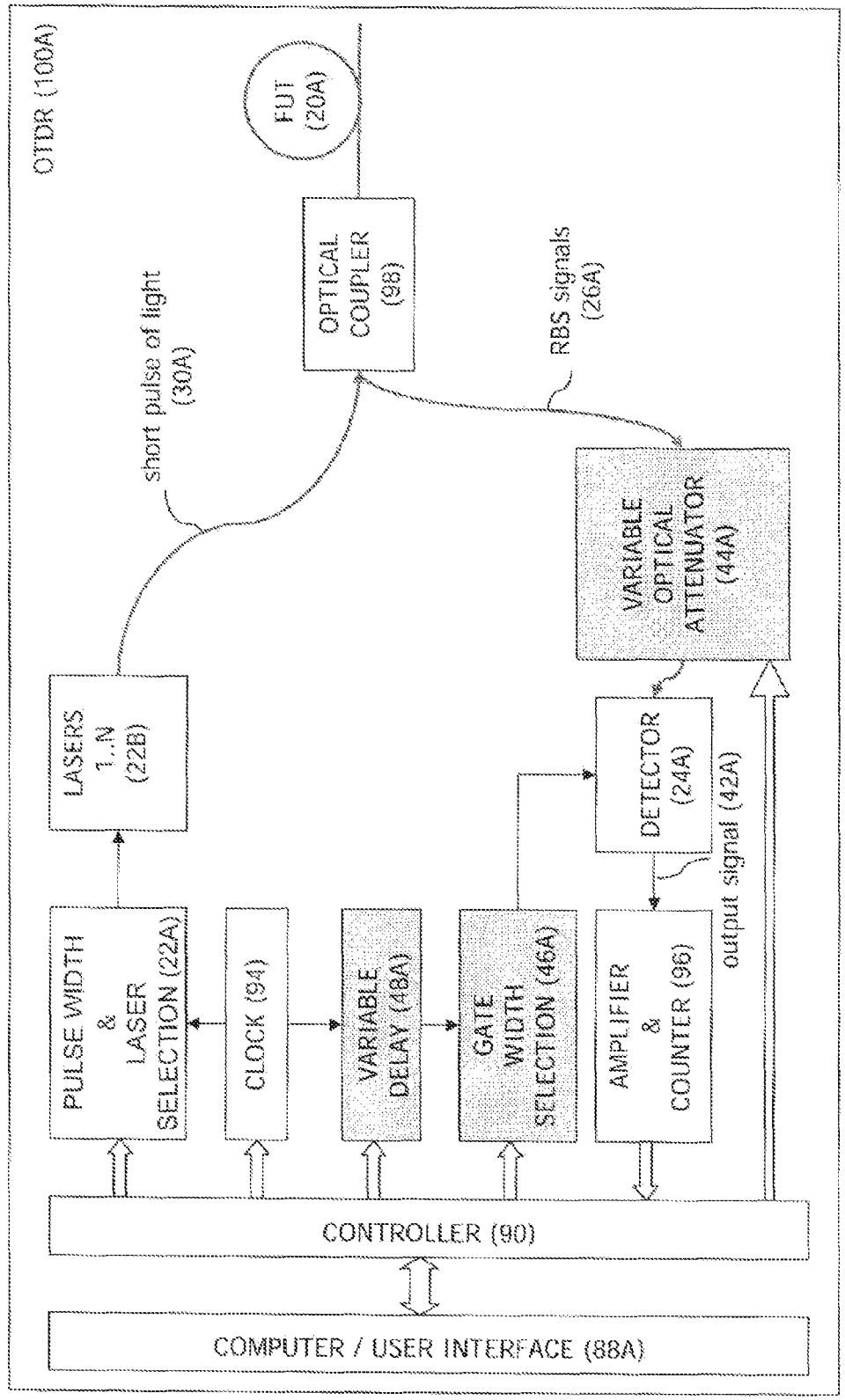
FIG. 7 is a block diagram of an OTDR implementing the features of FIG. 2, according to some embodiments.

FIG. 7 is a block diagram of a representative OTDR 100A, according to some embodiments. Unlike the simplified version of FIG. 2, FIG. 7 depicts many additional components that are present in an OTDR device. The light pulse generator 22 is replaced with a pulse width and laser selection circuit 22A as well as lasers 1 . . . N 22B. These circuits 22A and 22B generate the short pulse of light 30A that is to be received by the fiber under test 20A. An optical coupler 98 is also shown, to separate the signal 30A sent into the FUT 20A from the RBS signals 26A that emerges from the optical fiber 20A.

The RBS signals 26A are fed into a variable optical attenuator (VOA) 44A, such that an attenuated signal is fed into a detector 24A. In the embodiment of FIG. 7, the position circuit 48 is a variable (electronic) delay circuit 48A. Both the variable delay circuit 48A and a gate width selection circuit 46A are fed into the detector 24A. (A clock 94 supplies a periodic signal to the pulse width and laser selection circuit 22A and to variable delay circuit 48A.)

The output signal 42A coming from the detector 24A is fed into an amplifier and counter circuit 96. The counter of the circuit 96 counts the number of photons that were identified by the detector 24A during a given time interval.

As with the simplified OTDR representation of FIG. 2, the output of the OTDR 100A includes a computer/user interface 88A. This interface 88A may be used both to receive input from a user of the OTDR 100A, such as desired position and gate width parameters, and to supply a graph of the output representing the optical fiber characteristics to a display. The OTDR 100A also includes a controller 90, interfacing to several components simultaneously.

The OTDR 100 is thus advantageous over conventional OTDRs because it has a highly sensitive photodetector, a photon-counting photodetector, yet it has a high dynamic range as well. The OTDR 100 thus has a high spatial/temporal resolution, as compared to prior art OTDRs.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. An optical time domain reflectometer adapted to be coupled to one end of an optical fiber, the reflectometer comprising:
    a light pulse generator adapted to send a pulse of light into the optical fiber;
    a photon-counting photodetector adapted to detect a backscattering signal emerging from the optical fiber after the pulse of light is sent therein, and wherein the photodetector generates an output signal;
    a position circuit to instruct the photodetector to detect the backscattering signal from within a slice of the fiber under test defined between predetermined positions in the optical fiber; and
    a variable optical attenuator coupled between the optical fiber and the photodetector, the variable optical attenuator to attenuate the backscattering signal if the signal exceeds a predetermined strength;
    wherein the variable optical attenuator attenuates the backscattering signal at positions in the optical fiber determined by the position circuit.

2. The optical time domain reflectometer of claim 1, wherein the variable optical attenuator automatically and independently attenuates the backscattering signal at positions in the optical fiber determined by the position circuit.

3. The optical time domain reflectometer of claim 1, further comprising:
    a gate width circuit adapted to instruct the photodetector to detect backscattering signal from a predetermined position in the optical fiber for a predetermined duration.

4. The optical time domain reflectometer of claim 1, the photodetector comprising a first dynamic range, the variable optical attenuator comprising a second dynamic range, the optical time domain reflectometer comprising a third dynamic range, wherein the third dynamic range is a sum of the first dynamic range and the second dynamic range.

5. The optical time domain reflectometer of claim 1, wherein the position circuit is a variable electronic delay circuit.

6. The optical time domain reflectometer of claim 1, further comprising:
    a display coupled to the photodetector, wherein the output signal is presented to the display.

7. The optical time domain reflectometer of claim 1, further comprising:
    a display connector, enabling an external computer monitor or television screen to be coupled thereto, wherein the output signal is presented to the connected external computer monitor or television screen.

8. The optical time domain reflectometer of claim 1, wherein the position circuit is adapted to receive a position parameter, wherein the position parameter specifies a predetermined position in the optical fiber.

9. The optical time domain reflectometer of claim 8, further comprising: a device adapted to receive a gate width parameter, wherein the gate width parameter specifics the predetermined duration.

10. The optical time domain reflectometer of claim 1, further comprising:
    a signal regeneration block adapted to receive a plurality of output signals from the photodetector, each of the plurality of output signals representing a plurality of portions of the optical fiber, the signal regeneration block to generate a graph of a combined output signal, wherein the combined output signal represents characteristics of the plurality of portions tested.

11. The optical time domain reflectometer of claim 10, wherein the plurality of portions include adjacent portions of the optical fiber.

12. The optical time domain reflectometer of claim 10, wherein the plurality of portions are of equal duration.

13. The optical time domain reflectometer of claim 10, wherein the plurality of positions are of unequal duration.

* * * * *